United States Patent Office 3,135,662
Patented June 2, 1964

3,135,662

DIPHTHERIA TOXOID PREPARATION AND ITS PRODUCTION

Clifford George Pope and Frank Valentine Linggood, London, England, assignors to Burroughs Wellcome & Co. (U.S.A.) Inc., Tuckahoe, N.Y.
No Drawing. Filed Dec. 28, 1961, Ser. No. 162,912
Claims priority, application Great Britain Jan. 5, 1961
5 Claims. (Cl. 167—78)

This invention relates to toxoids derived from toxins of bacterial origin, and to their production.

Protection against several bacterial diseases, such as diphtheria in man and enterotoxaemia in sheep, may be achieved by immunising the host with toxoids derived from the toxins produced by the pathogenic bacteria. The toxoids may be produced by treating the toxins with formaldehyde. Toxoids produced in this way from crude toxin preparations have the disadvantage of not being uniformly antigenic; as soluble toxoids their antigenicity may be low and they are usually combined with an adjuvant, such as an aluminium compound, to give an effective vaccine. On the other hand, the treatment of purified toxins such as purified diphtheria toxin with formaldehyde alone is not satisfactory, because (although the conversion to toxoid may be apparently complete) after the removal of excess of formaldehyde the toxoid may show signs of reversal to a toxic state on dilution and storage.

This invention provides toxoids produced from purified bacterial toxins which are highly antigenic as soluble toxoids and are relatively stable; they are suitable components for vaccines.

The toxoids of this invention are produced by treating bacterial toxins with formaldehyde in the presence of certain amines of low molecular weight. Examples of these amines are lysine (I) and ethylenediamine (II).

In this invention, it is preferable to use purified bacterial toxin preparations that contain little or none of the nitrogenous material of low molecular weight that may be present initially in crude toxin preparations, because much less antigenic toxoids may be produced in the presence of some amines not of the above-defined class. Satisfactory toxoids may, however, be produced by the method of the invention in the presence of mixtures of amines consisting partly of lysine or ethylene diamine and partly of other amines, for example mixtures of lysine and alanine.

The relative proportions of formaldehyde and amine of the above-defined class used in this invention may be varied according to the circumstances. When a purified toxin is treated with formaldehyde in the presence of lysine or ethylene diamine, the molar concentration of the latter should preferably be not greater than that of formaldehyde and may, for example, be between 20% and 100% of that of formaldehyde.

The invention therefore comprises a toxoid produced by treating a bacterial toxin with formaldehyde in the presence of lysine or ethylene diamine, and further comprises the novel method described above for producing toxoids.

Although the scope of this invention need not be restricted by any particular theory of its operation, it is thought that the formaldehyde links molecules of the added amine with the toxin molecules (represented in the following formulae as [T].H) by reaction with active hydrogen atoms on amino or other groups reactive with formaldehyde. In the presence of lysine, for example, reaction may occur as follows:

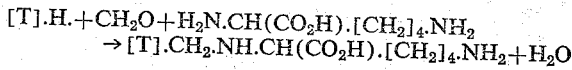

$$[T].H.+CH_2O+H_2N.CH(CO_2H).[CH_2]_4.NH_2 \rightarrow [T].CH_2.NH.CH(CO_2H).[CH_2]_4.NH_2+H_2O$$

The high antigenicity and relative stability of the toxoids of this invention may be associated with the presence in the products of basic side-chains derived in this way from the added amine. Possibly the toxoid produced in treating purified toxins with formaldehyde alone is unsatisfactory because of the reversible formation of reactive hydroxymethyl groups and the linking of toxin molecules.

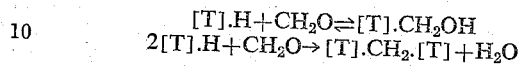

$$[T].H+CH_2O \rightleftharpoons [T].CH_2OH$$
$$2[T].H+CH_2O \rightarrow [T].CH_2.[T]+H_2O$$

For ease of explanation, the toxin molecule [T].H has been shown above as having only one active hydrogen atom, but being a protein molecule it may in fact have many active hydrogen atoms and may be more accurately represented by the formula $[t](H)_n$. The novel toxoids of the invention may therefore contain several aminomethyl radicals $CH_2Y$ per molecule of toxoid and may be more accurately represented by the formula $[t](CH_2.Y)_n$. In these formulae, $[t]$ represents the radical formed from a bacterial toxin molecule by the loss of one or more hydrogen atoms on groups reactive with formaldehyde, and for any particular toxoid molecule $n$ is a positive integer, although it is not necessarily the same integer for all the toxoid molecules in a sample of toxoid and may thus be a non-integral positive number for the sample as a whole.

The following examples illustrate the invention.

*Example 1*

A solution of 27 g. L-lysine monohydrochloride (0.15 mole) (containing 2% D-enantiomer) in 2000 ml. distilled water was treated successively with 15 g. sodium bicarbonate, 15 ml. 36% w./v. formaldehyde solution (0.18 mole) and 600 ml. of a solution of purified diphtheria toxin containing about 3000 Lf units/ml. and at least 2200 Lf units/mg. protein nitrogen, determined against international standard (flocculation) antitoxin. The mixture was made up to 3000 ml., adjusted to pH 7.6, and sterilised by filtration; it then contained 570 Lf units/ml.

The mixture was kept at 18–20° C. for 3 weeks, and then was at pH 7.1 and contained 560 Lf units/ml. A sample diluted ten-fold in borate buffer was non-toxic to guinea pigs and rabbits on intracutaneous injection. To complete the conversion of toxin into toxoid, the mixture was incubated at 32° C. for 3 weeks, and then was at pH 7.25 and contained 540 Lf units/ml., a fall of no significance.

A small volume of the toxoid solution was dialysed against distilled water containing 0.01% sodium o-(ethylmercurithio)benzoate, and then tested intracutaneously in rabbits, establishing that the product after removal of formaldehyde was completely non-toxic. The bulk of the toxoid solution was treated with ammonium sulphate and sodium bicarbonate at the rate of 44 g. ammonium sulphate and 0.5 g. sodium bicarbonate per 100 ml. solution, and left overnight. The precipitated toxoid was filtered off and redissolved in about 600 ml. 0.01% sodium bicarbonate solution and dialysed until free from sulphate.

*Example 2*

A toxoid was prepared by the procedure of Example 1 from purified diphtheria toxin in the presence of 0.05 M-L-lysine 0.05 M-L-alanine and 0.06 M-formaldehyde.

*Example 3*

A toxoid was prepared by the procedure of Example 1 from purified diphtheria toxin in the presence of 0.025 M-L-lysine, 0.075 M-L-alanine and 0.06 M-formaldehyde.

Example 4

A 36% w./v. formaldehyde solution was added 5 ml. (0.06 mole) per litre, to a solution of purified diphtheria toxin containing 50 Lf units/ml. in 0.5% w./v. sodium bicarbonate solution. Ethylenediamine was then added, 0.1 mole per litre, in small portions, each followed with hydrochloric acid to prevent the mixture from becoming too alkaline. (Alternatively, the ethylenediamine may be neutralised before addition.) The mixture was finally adjusted to pH 7.6 and was kept at 18–20° C. for 11 weeks; more formaldehyde, 0.06 mole per litre, was added at 3 weeks, and another 0.06 mole per litre was added at 6 weeks. The mixture was incubated at 32° C. for 3 weeks, and then dialysed to remove formaldehyde, giving a solution of satisfactorily antigenic diphtheria toxoid, which remained stable and non-toxic.

Example 5

Formaldehyde, 0.06 mole per litre, and ethylenediamine, 0.05 mole per litre, were added to a solution of purified diphtheria toxin in the manner described in Example 4, and the mixture was kept at 18–20 C. for 7 weeks; more formaldehyde, 0.06 mole per litre, was added at 3 weeks, and another 0.012 mole per litre was added at 7 weeks. The mixture was incubated at 32° C. for 3 weeks and dialysed to give a solution of diphtheria toxoid.

Example 6

Formaldehyde, 0.06 mole per litre, and ethylenediamine, 0.0125 mole per litre, were added to a solution of purified diphtheria toxin in the manner described in Example 4, and the mixture was kept at 18–20° C. for 7 weeks. It was incubated at 32° C. for 3 weeks and dialysed to give a solution of diphtheria toxoid.

*Vaccines.*—Sterile injectable solutions of the diphtheria toxoids described in the preceding examples, in sealed single- or multidose containers, may be used as vaccines for the prophylaxis of diphtheria. For example, the toxoid of Example 1 has been incorporated in diphtheria vaccine (in particular purified toxoid aluminum phosphate), diphtheria-tetanus vaccine and diphtheria-pertussis-tetanus vaccine of the British Pharmacopoeia. The relative stability of the toxoid enables the vaccines of this invention to be given a longer shelf life than existing vaccines where the stability of the diphtheria component is the limiting factor.

We claim:
1. A method of producing diphtheria toxoid which comprises reacting purified diphtheria toxin concurrently with formaldehyde and lysine.
2. A method according to claim 1 in which the molar concentration of the lysine is between 20% and 100% of that of formaldehyde.
3. A method of producing diphtheria toxoid which comprises reacting purified diphtheria toxin concurrently with formaldehyde and ethylene diamine.
4. Diphtheria toxoid when produced by the method of claim 1.
5. Diphtheria toxoid when produced by the method of claim 3.

References Cited in the file of this patent

UNITED STATES PATENTS

| | | |
|---|---|---|
| 2,399,443 | Masucci | Apr. 30, 1946 |
| 2,492,453 | Yates | Dec. 20, 1949 |
| 2,528,972 | Pillemer | May 22, 1950 |

OTHER REFERENCES

Wadsworth: Biol. Abst., 1938, p. 937, paragraph 10158.

French et al.: Advances in Protein Chemistry, vol. II, 1945, pp. 328–330.

Fraenkel-Conrat et al.: J.A.C.S., 1948, vol. 70, 2673–2684.

Fraenkel-Conrat et al.: J. Biol. Chem., 1948, vol. 174, pp. 827–843.

Cox: Annual Review of Microbiology, vol. 7, pp. 197–218, 1953.

Kabat et al.: Experimental Immunochemistry, 2nd Ed. (1961), Charles C. Thomas Pub., Springfield, Ill., pp. 459–465.

Torban: "The Mechanism of Detoxication by Formalin," Biokhimya 25, pp. 28–33 (1960); abstracted in English in Chem. Abstracts 54, 21228i, October 25, 1960.

Neumuller: "Detoxification of Diphtheria Toxin With Formaldehyde Mixed With an Amino Acid," Nature 174, pp. 405–406 (1954).